United States Patent Office 3,435,261
Patented Mar. 25, 1969

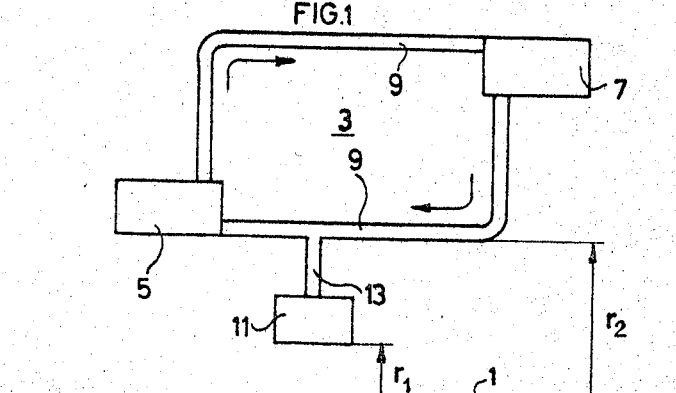
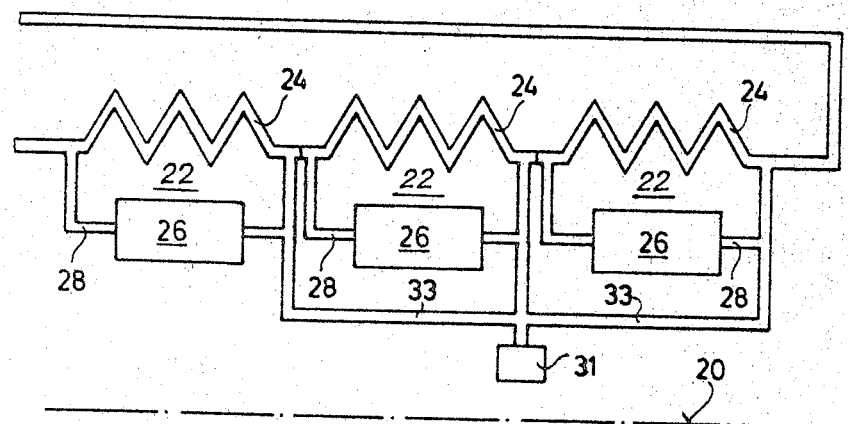
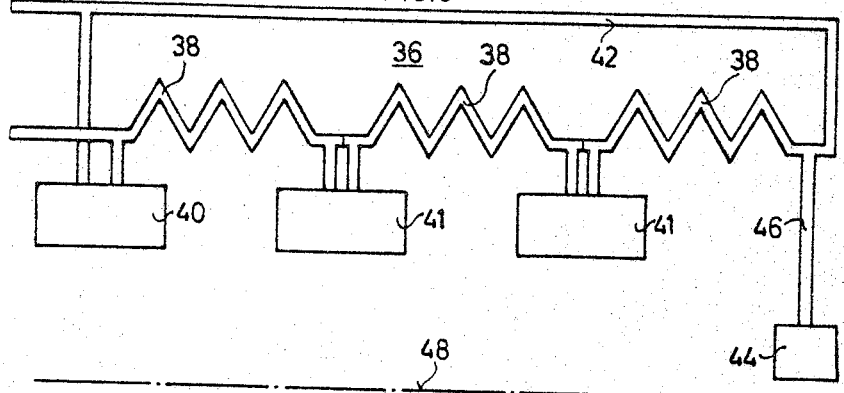

3,435,261
ELECTRIC MACHINE HAVING A LIQUID-COOLED ROTOR
Hans Spiess, Rapperswil, Saint Gall, Switzerland, assignor to Oerlikon Engineering Company, a corporation of Switzerland
Filed Apr. 28, 1966, Ser. No. 545,983
Int. Cl. H02k 9/00, 9/19
U.S. Cl. 310—54                              8 Claims

ABSTRACT OF THE DISCLOSURE

Rotor of electric machine carries closed liquid circulation system for cooling windings. System includes a cooler and conduits for conducting liquid between cooler and windings. Rotor carries a liquid-containing expansion vessel for applying a static pressure to the cooling liquid in the system, the vessel being located closer to the rotor axis of rotation than any part of the cooling system.

---

The present invention relates to liquid-cooled rotors of electric machines, in which the entire cooling system rotates with the rotor. The scope of the present invention also includes a cooling system for electric motors and generators which comprises more than one cooling loop.

Systems are known for circulating liquid coolants about the rotors of electric machines, in which the cooler of the system rotates with the rotor. In the known apparatus, the closed cooling loops of the separate cooling system extend over the entire length of the rotor and are connected to a central receiver. As a result, these loops may become very long, particularly in the case of long rotors, and the loss of pressure in the loops exceeds acceptable limits. This not only reduces the rate of circulation of the cooling liquid, but also results in static pressures being formed in the parts of the cooling system nearest the axis of rotation of the rotor. This presents the danger of formation of bubbles which may result in a stoppage of the circulation of the cooling liquid. Furthermore, the collapse of these bubbles may produce shocks in the cooling system.

A general object of the present invention is the elimination of these and other problems. The invention is characterized by the provision of at least one expansion chamber communicating with the cooling system. This expansion chamber is located nearer the axis of rotation of the rotor than any other part of the cooling system.

Several forms of construction of the invention are schematically illustrated in the drawings, in which:

FIG. 1 is a schematic representation of a cooling circulation loop in a liquid-cooled rotor;

FIG. 2 is a schematic representation of a cooling arrangement in a rotor having three cooling circulation loops which are arranged in parallel along the axis of rotation of the rotor; and FIG. 3 is a schematic representation of a cooling arrangement, analogous to the one described in FIG. 1, having means for intermediate cooling of the cooling liquid.

In a liquid-cooled rotor, for example in the rotor of an electric machine, a closed cooling liquid circulation loop 3, which rotates along with the rotor, is arranged in spaced relation to the axis of rotation 1 of the rotor. A cooler 5 is arranged within the cooling liquid circulation loop 3.

Conduits 9 extend from the cooler 5 to the windings 7 of the rotor which carry electric current and, therefore, become heated. The heated cooling medium flows from the windings 7 through one of the connecting pipes 9 to the cooler 5. Subsequent to cooling, the medium flows through another connecting pipe 9 to the heated current-carrying windings 7.

According to the present invention, an expansion chamber 11 is connected by means of an expansion pipe 13 to a connecting pipe 9 between the cooler 5 and the windings 7. The distance between the expansion chamber 11 and the axis of rotation 1 of the rotor is designated by $r_1$. The distance between the part of the cooling liquid circulation loop 3, other than the chamber 11, nearest to the axis of rotation 1 is designated by $r_2$.

During the operation of the machine, the rotor rotates on its axis 1. As a result of the variations in density of the cooling medium, the centrifugal forces caused by this rotation act on the cooling liquid and cause the flow of the cooling liquid in the circulation loop 3 in the direction of the arrows of FIG. 1. The formation of gas bubbles in the cooling liquid circulation loop 3 at temperatures above the boiling point of the cooling liquid means is prevented by superimposing a static pressure on the cooling liquid in the circulation loop 3.

This static pressure is produced as a result of the presence of the liquid cooling medium in the expansion chamber 11, the chamber 11 being closer to the axis of rotation 1 than any other portion of the cooling loop 3. If the rotor rotates at an angular velocity $\omega$, and if the specific gravity of the cooling liquid in the expansion pipe 13 and in the expansion chamber 11 is designated by $\gamma$, the magnitude of the additional static pressure superimposed on the cooling medium in circulation loop 3 is defined by the expression:

$$\Delta p = \frac{\gamma}{2g}\omega^2[r_2^2 - r_1^2]$$

It will be appreciated that it is possible to adjust the static pressure in the cooling liquid circulation loop to such a value that the cooling liquid temperature never reaches a level at which the liquid will boil. Therefore, an apparatus of the type described insures the proper cooling and normal operation of the rotor.

FIG. 2 shows the axis of rotation 20 of the rotor and three individual closed cooling liquid circulation loops 22, each of which is provided with a heat-absorbing part 24. Each of the circulation loops 22 has its own cooler 26 and separate pipe systems 28. The arrangement of a plurality of circulation loops shown in FIG. 2 has the advantage that, as a result of the shortness of each cooling system, each of the individual circulation loops produces considerably reduced frictional losses in the flowing fluid for the same cross-section pipes, as compared to a comparable system employing only one loop. In this manner it is possible to operate with considerably smaller quantities of liquid, since the difference in temperature between inlet and outlet of each individual cooling circulation loop may reach the maximum value caused by the smallest existing static pressure. Three individual circulation loops require only ⅓ of the quantity of liquid which must circulate through a comparable single circulation loop of the same total surface area, assuming the heat transfer ratios are equal and the temperature differentials are the same.

By increasing the pressure on the liquid cooling medium in the circulation loops, the quantity of cooling medium required is reduced, since the temperature of the medium can be raised to a higher temperature without danger of its boiling. The static pressure on the medium is increased, in the manner described above, by employing an expansion chamber 31 which communicates with the loops 22 via pipes 33.

The arrangement shown in FIG. 3 operates in the same manner. A cooling system 36 comprises three heat-absorbing parts 38 which may be secured to the electric current-carrying parts of the rotor, such as the windings. The parts 38 are connected in series, with each other and with a cooler 40, two intermediate coolers 41, and a return pipe 42. In this embodiment, an expansion chamber 44 again is connected to the cooling circulation loop through an expansion pipe 46 in order to increase the static pressure in the manner described above. The rotor and the cooling system rotate around the axis of rotation 48. It is to be noted that expansion chamber 44 is disposed nearer to the axis of rotation 48 than any other element of the cooling loop.

As a result of the designs illustrated in FIGS. 2 and 3, smaller quantities of cooling liquid are required and the use of cooling pipes of smaller cross-sections is possible. In this manner, more space is made available for the current-carrying conductors and the current load of the conductors carrying the cooling loops can be increased. In the three forms of construction discussed above, the motion of the cooling liquid is caused by the centrifugal forces acting on the liquid. As a consequence of the variation of density of the cooled and heated cooling liquid, the compressive forces vary in parts of the cooling circulation loop at different radial distances from the axis of rotation. This results in the flow of the cooling liquid medium.

The cooler can be constructed in any known manner. For example, a sheet-metal cooler with pipes which are arranged concentrically and/or spirally or helically around the shaft of the rotor can be used. It is advantageous to form the current-carrying parts of the rotor, for example the coil ends, as coolers and to equip them for this purpose with cooling flanges. Furthermore, feed pipes leading to the liquid-carrying rotor parts can be included in the cooling circulation. It is advantageous to arrange the connection of the expansion system 11, 13 to the cooling circulation at the point of the lowest static pressure. This point is found at the part of the cooling circulation loop which is parallel to the axis of rotation prior to the transition into the radial channel part.

It will be understood that the embodiments disclosed are merely for purposes of illustration, and that variations may be made therein without departing from the spirit and scope of this invention as defined in the appended claims.

What is claimed is:
1. In an electric machine having a rotor and windings carried by said rotor and subjected to heating:
a closed liquid circulating system for cooling said winding, said system including a cooler and conduits for conducting cooling liquid between said windings and said cooler, said cooler and conduits being carried by and rotatable with said rotor, and a liquid-containing expansion vessel carried by and rotatable with said rotor and communicating with said cooling system for applying a static pressure to the liquid in said closed cooling system, said vessel being arranged closer to the axis of rotation of said rotor than any part of said cooling system.

2. In an electric machine, the arrangement defined in claim 1 wherein said vessel is connected to a part of said cooling system closest to the rotor axis of rotation.

3. In an electric machine, the arrangement defined in claim 1 wherein said cooling system comprises a plurality of individual closed liquid circulation loops, each of said loops having its own cooler.

4. In an electric machine, the arrangement defined in claim 3 wherein said expansion vessel communicates with each of said individual loops.

5. In an electric machine, the arrangement defined in claim 1 wherein said cooling system includes a plurality of coolers arranged at spaced apart points of said system, said coolers being connected in series.

6. In an electric machine, the arrangement defined in claim 1 wherein said cooler comprises the ends of said windings, and fins carried by said winding ends.

7. In an electric machine, the arrangement defined in claim 1 wherein said cooler includes conduits arranged concentrically around said rotor.

8. In an electric machine, the arrangement defined in claim 7 wherein said cooler conduits are in the shape of a helix.

References Cited

UNITED STATES PATENTS 2,970,232   1/1961   Kilbourne _____ 310—54

WARREN E. RAY, *Primary Examiner.*

R. SKUDY, *Assistant Examiner.*

U.S. Cl. X.R.

310—58